United States Patent
Jackson et al.

(10) Patent No.: US 8,355,395 B2
(45) Date of Patent: Jan. 15, 2013

(54) CONTROLLING REGISTRATION FLOODS IN VOIP NETWORKS VIA DNS

(75) Inventors: James E. Jackson, Austin, TX (US); Chaoxin Qiu, Austin, TX (US); Mehrad Yasrebi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 593 days.

(21) Appl. No.: 12/589,235

(22) Filed: Oct. 20, 2009

(65) Prior Publication Data

US 2011/0090900 A1   Apr. 21, 2011

(51) Int. Cl.
*H04L 12/66* (2006.01)
(52) U.S. Cl. .................................... 370/352; 370/401
(58) Field of Classification Search .................. None
See application file for complete search history.

(56) References Cited

U.S. PATENT DOCUMENTS

| | | | |
|---|---|---|---|
| 6,981,029 B1 * | 12/2005 | Menditto et al. | 709/217 |
| 2004/0010544 A1 * | 1/2004 | Slater et al. | 709/203 |
| 2010/0186079 A1 * | 7/2010 | Nice et al. | 726/14 |

* cited by examiner

*Primary Examiner* — Chirag Shah
*Assistant Examiner* — Minh-Trang Nguyen

(57) ABSTRACT

A mechanism controls global synchronization, or registration floods, that may result when a large number of endpoints in a Voice over Internet Protocol (VoIP) network such as an Internet Protocol Multimedia Subsystem (IMS) come online simultaneously after a catastrophic failure. The mechanism allows the Domain Name System (DNS) infrastructure to efficiently control the overload condition by registering user end points with backup border elements, and by staggering and by randomizing the time-to-live (TTL) parameter in registrations with backup border elements.

20 Claims, 4 Drawing Sheets

CONTROLLING REGISTRATION FLOODS IN VOIP NETWORKS VIA DNS

FIELD OF THE DISCLOSURE

The present invention relates generally to Voice over Internet Protocol (VoIP) networks. More particularly, the present application relates to methods and systems for recovering from a catastrophic failure that results in a larger number of endpoints coming on line simultaneously after the VoIP network is restored.

BACKGROUND

A simplified call flow for registration of user endpoint devices is illustrated by the sequence diagram 100 shown in FIG. 1. The timeline illustrates the messaging typically used in registering a user endpoint device (UE) 110 with a VoIP network 130 such as a Next Generation Network (NGN).

To prepare for registration, the UE 110 transmits two levels of Domain Name System (DNS) queries to a DNS server. First, an SRV query 151 against a high-level Fully Qualified Domain Name (FQDN) is transmitted to a DNS server 124. One or more FQDNs are returned in a response 152; the FQDNs corresponding to specific border elements of the VoIP network. A second DNS A query 153 is then transmitted to determine the IP addresses of those FQDNs. The IP addresses are returned at 154 from the DNS server 124 to the UE 110.

The UE 110 then registers via a border element 132 such as a Session Border Controller (SBC) in the VoIP network 130, by transmitting a Session Initiation Protocol (SIP) registration request 155 to the border element 132. The registration request includes at least one Internet Protocol (IP) address of a FQDN. The border element 132, in turn, registers with a registrar 134 on behalf of the VoIP user endpoint 110 by forwarding the registration request at 156. The registrar 134 then populates a local registration cache.

During recovery from a catastrophic failure such as a widescale power outage, a large number of VoIP endpoints such as UE 110 may come online simultaneously. A VoIP network can easily become overwhelmed when all endpoints attempt to come online simultaneously. In an environment based on SIP, the endpoints will all issue SIP REGISTER registration requests 155 within a small window of time. A large percentage of those REGISTER messages will fail with a SIP error or timeout as a result of the overload. The endpoints may retransmit in a timeout scenario or they may attempt to re-register in an error scenario. In either case, the timers in the endpoints that control this process will, for the most part, be the same and the global synchronization attempts and failures will continue. Furthermore, the VoIP infrastructure may become overwhelmed and even calls from registered endpoints may fail.

A backoff scheme has been proposed to address the above problems, wherein a backoff algorithm is incorporated into the VoIP user endpoints 110. That approach, however, is very static in nature. A given VoIP endpoint does not know whether a failure impacts itself or many endpoints, how many endpoints are affected, and at what rate the network can allow them to come back online.

Solutions implemented at the VoIP border element 132 have also been considered. In those solutions, the border elements must still process the message flood, while gracefully rejecting some of the requests.

There therefore remains a need for a method and system capable of quickly and automatically reinstating a VoIP communications system after a catastrophic failure. The technique should re-register user endpoints as quickly as possible without overwhelming the VoIP network.

SUMMARY

The present invention addresses the needs described above by providing a method for registering a multimedia endpoint via a border element in a multimedia network. At a DNS server in the multimedia network, a DNS query is received from the multimedia endpoint, the query containing an identifier of the end point and requesting an address of a border element for use in registering for a multimedia service. Based on the identifier of the end point, a primary border element associated with the end point is determined. If a volume of DNS queries from end points associated with the primary border element is below a threshold capacity of the primary border element, then the DNS query is responded to with an identification of the primary border element for use by the endpoint in registering for the multimedia service.

If the volume of DNS queries is above the threshold capacity of the primary border element, then a backup border element associated with the end point is determined. If a volume of DNS queries from endpoints associated with the backup border element is below a threshold capacity of the backup border element, then the DNS query is responded to with an identification of the backup border element for use by the endpoint in registering for the multimedia service.

If the volume of DNS queries of the primary border element is above a threshold capacity of the primary border element and if a volume of DNS queries of the backup border element is above a threshold capacity of the backup border element, then the DNS query is responded to with a message forcing the endpoint to transmit another DNS query at a later time.

The step of responding to the DNS query with an identification of the backup border element for use by the endpoint in registering for the multimedia service may further include randomizing a TTL parameter in the DNS query response to allow reverting of end points to primary border elements in a controlled manner.

The DNS server preferably utilizes a standard DNS protocol in receiving and responding to DNS queries. The border elements may be session border controllers. The multimedia service may be a VoIP service. The backup border element may be a primary border element associated with a second endpoint.

The identifier of the endpoint may be an IP address. The address of the border element may be an FQDN.

If the volume of DNS queries is below a threshold capacity of the primary border element, then the method may further comprise the steps of receiving at the primary border element a registration request from the end point; and transmitting from the primary border element to a network registrar a registration request on behalf of the endpoint.

The step of determining a primary border element associated with the end point may further include determining a plurality of primary border elements associated with the end point, and the step of responding to the DNS query with an identification of a primary border element for use by the endpoint in registering for the multimedia service may be performed if the volume of DNS queries of any one of the associated primary border elements is below a threshold capacity of that primary border element.

Another embodiment of the invention is a computer-usable medium having computer readable instructions stored thereon for execution by a processor to perform a method for registering a multimedia endpoint via a border element in a multimedia network as described above.

DESCRIPTION

The present disclosure describes a mechanism for controlling global synchronization, or registration floods, that may result when a large number of endpoints in a VoIP network such as an Internet Protocol Multimedia Subsystem (IMS) come online simultaneously after a catastrophic failure. The catastrophic failure may, for example, be a wide-scale power outage, cable cut, or any failure that causes a large number of user endpoints to be dropped and that results in those endpoint attempting to come on line simultaneously. The mechanism described herein allows the DNS infrastructure to efficiently control the overload condition.

The present disclosure describes a mechanism for preventing the message flood by using a custom DNS infrastructure with added intelligence. That mechanism allows some DNS requests to be rejected, and DNS responses to be modified, effectively distributing the load across a number of border elements. Furthermore, it manipulates DNS TTL parameters to allow endpoints to gradually revert to their original border elements.

The present disclosure describes modified DNS responses, allowing endpoints to be temporarily assigned to other border elements. That scheme further allows the endpoints to automatically revert back to their originally assigned border elements in a controlled manner.

Figure 2:
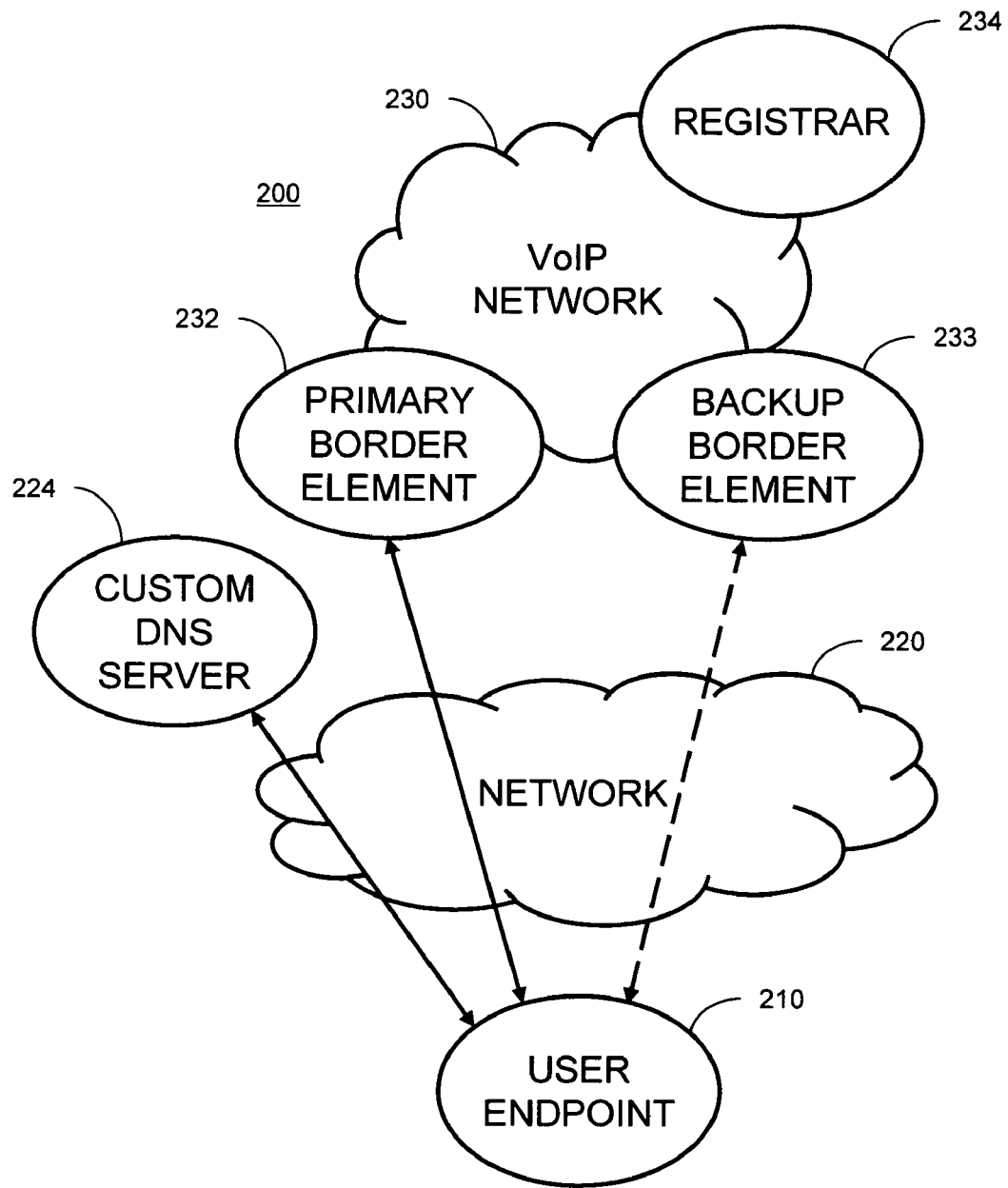
FIG. 2 is a block diagram showing a network configuration as described in the present disclosure.

An example architecture 200 of a system as disclosed herein is shown in FIG. 2. A user endpoint 210 communicates through a network 220, such as the Internet, with a custom DNS server 224. The user endpoint 210 is also in communication with a primary border element 232 and/or a secondary or backup border element 233 in a VoIP network 230, as described below. The VoIP network 230 also contains a registrar 234 for registering user endpoints with border elements.

The custom DNS server 224 may include a processor for executing methods and steps that are stored on computer-readable media such as ROM or RAM memory, magnetic memory such as disks or tape, or optical memory. The processor is connected to a bus that communicates with a reader of the computer-readable media. The DNS server bus also communicates with input and output devices, data storage devices and communications ports for communicating through the network 220.

Figure 1:
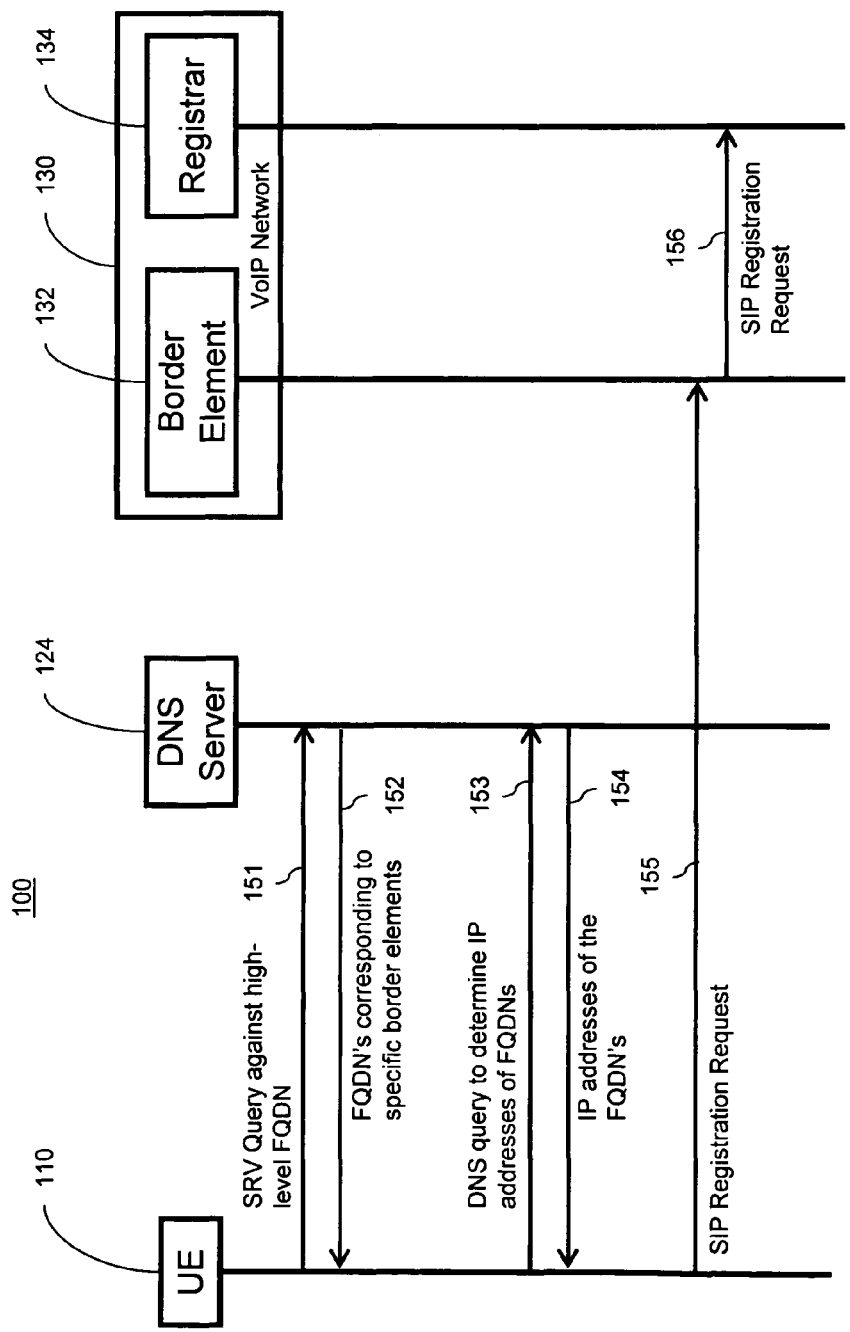
FIG. 1 is a sequence diagram showing the registration procedure of a user endpoint with a VoIP registrar.
Figure 3:
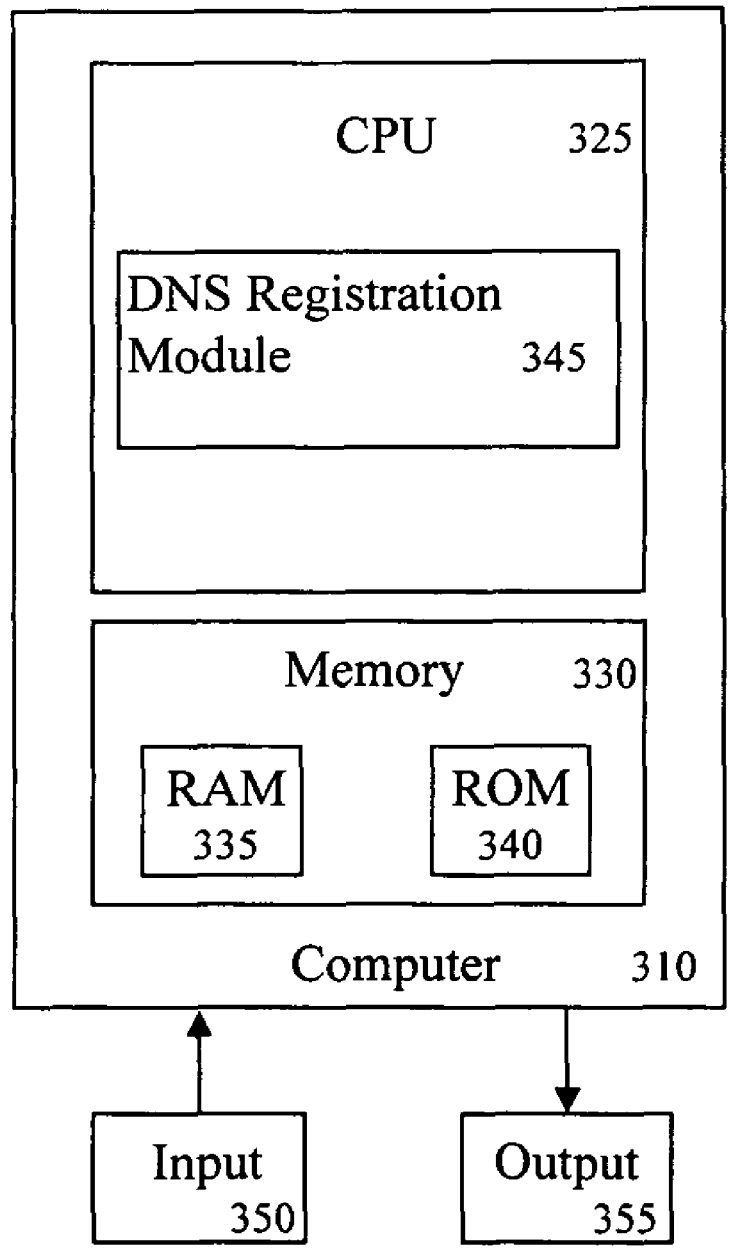
FIG. 3 is a schematic diagram of a computer processor according to the present disclosure.

FIG. 3 illustrates an example computer system 300 for performing the presently disclosed methods. As shown in FIG. 1, the system 300 includes a computer 310. The computer 310 may be part of a custom DNS server (not shown), or may connected for controlling one or more DNS servers.

The computer 310, which may be a portable or laptop computer or a mainframe or other computer configuration, includes a central processing unit (CPU) 325 and a memory 330 connected to an input device 350 and an output device 355. The CPU 325 includes a DNS registration software module 345 configured to perform one or more methods as discussed herein. Although shown inside the CPU 325, the module 345 can be located outside the CPU 325.

The memory 330 includes a random access memory (RAM) 335 and a read-only memory (ROM) 340. The memory 330 can also include a database, disk drive, tape drive, etc., or a combination thereof. The RAM 335 functions as a data memory that stores data used during execution of a program in the CPU 325 and is used as a work area. The ROM 340 functions as a program memory for storing a program executed in the CPU 325. The program may reside on the ROM 340 or on any other computer-usable medium as computer readable instructions stored thereon for execution by the CPU 325 or other processor to perform the methods of the invention. The ROM 340 may also contain data for use by the programs, such as routing data and DNS parameters.

The input 350 may be a keyboard, mouse, network interface, etc., and the output 355 may be a liquid crystal display (LCD), cathode ray tube (CRT) display, printer, etc.

The computer 310 can be configured to operate and display information by using, e.g., the input 350 and output 355 devices to execute certain tasks. Program inputs may be input through the input 350, may be stored in memory 330, or may be received as live data from the DNS system.

Returning to FIG. 2, the custom DNS server 224 utilizes standard DNS protocol in implementing the presently described methods. DNS utilizes primarily User Data Protocol (UDP) to serve requests. A DNS query includes a single UDP request from the client followed by a single UDP reply from the server. In implementing the presently described systems and methods, the DNS server is customized by manipulating parameters used within the standard DNS protocol.

In the system and methods described in the present disclosure, the custom DNS server 224 is configured with several parameters. First, primary border elements such as element 232 are associated in a database with each high-level FQDN. Second, backup border elements such as element 233 are also associated each of the high-level FQDNs. The backup border elements may be primary border elements for high-level FQDNs in other geographic locations, that are most likely unaffected by a given catastrophic failure affecting the subject high-level FQDN. Third, the custom DNS server 224 is configured to allow only a maximum number of registrations to each border element. Thresholds defining those maxima may also be stored in a database.

The custom DNS server 224 maintains a running window of the number of requests processed for each border element. If the number of requests exceeds the assigned capacity or maximum threshold of a primary border element, the DNS server modifies subsequent responses to distribute the additional load across the backup border elements. If the number of requests received by the DNS server exceeds the assigned capacity of both the primary border element and the backup border elements, the DNS server responds with a DNS error that forces the client to re-query the DNS server at a later time.

The DNS TTL parameters for responses that specify the backup border elements are furthermore randomized over a given time window to allow the endpoints to automatically revert to their normal primary border elements in a controlled manner, without overwhelming the border elements. For example, each registration of a UE with a backup border element may include a TTL parameter expiring at a random point during a defined future time period. In that way, the primary border elements will not be overwhelmed as registrations with backup border elements simultaneously expire. Note that reverting to the primary border elements would not impact any in-progress calls.

Figure 4:
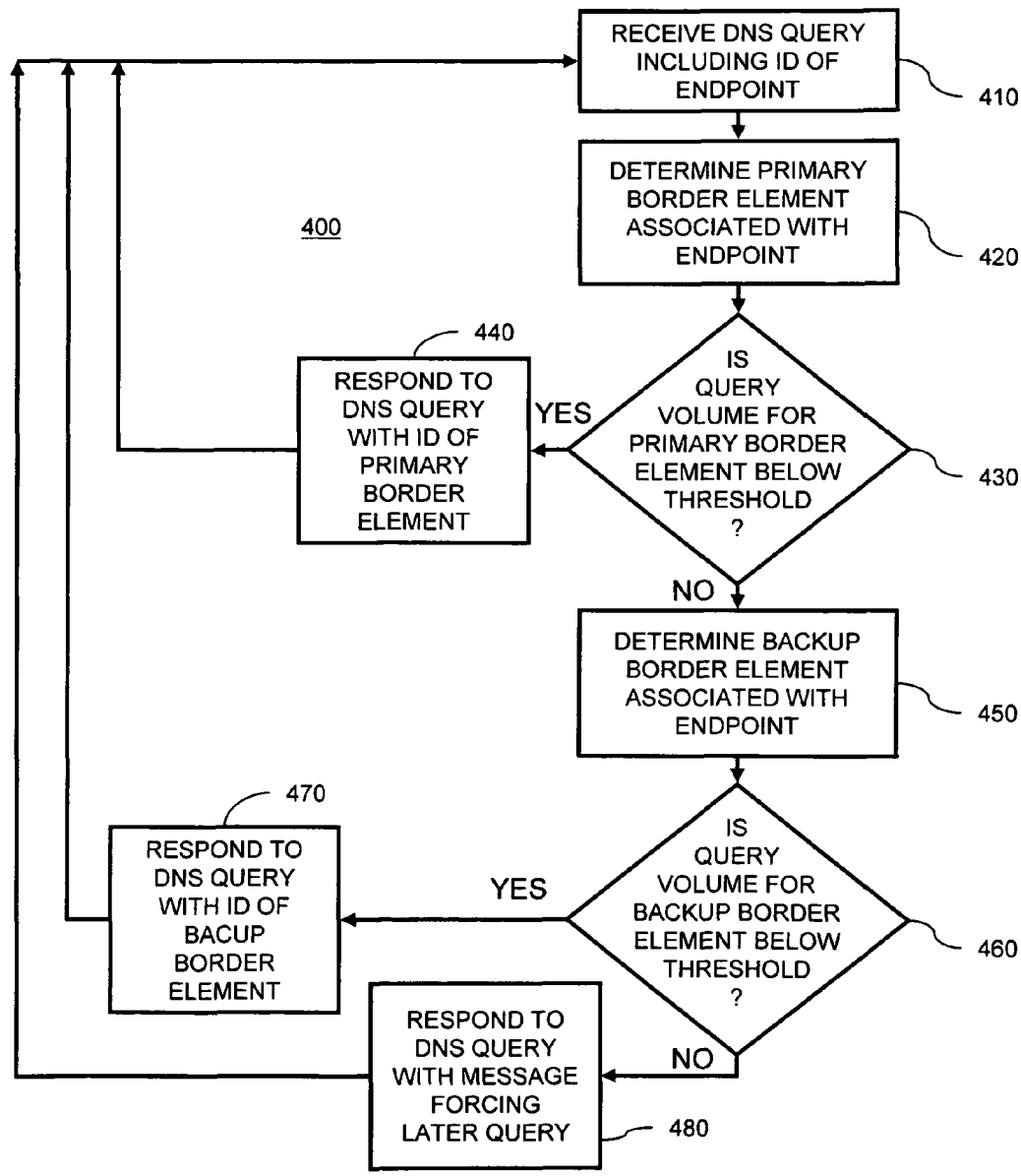
FIG. 4 is a flow chart showing a method as described in the present disclosure.

A method in accordance with the present disclosure is represented by the flow chart 400 of FIG. 4. In the method, a multimedia endpoint is registered via a border element in a multimedia network such as a VoIP network. The method starts at step 410 wherein, at a DNS server in the multimedia network, a DNS query is received from the multimedia user endpoint. The query contains an identifier of the user endpoint and requests an address of a border element for use in registering for a multimedia service.

Based on the identifier of the end point, a primary border element associated with the user endpoint is determined at 420. If a volume of DNS queries from user endpoints associated with the primary border element is below a threshold capacity of the primary border element, as determined at 430, then the DNS server responds to the DNS query at 440 with an identification of the primary border element for use by the endpoint in registering for the multimedia service.

If, on the other hand, the volume of DNS queries is above a threshold capacity of the primary border element, then a secondary or backup border element associated with the endpoint is determined at 450.

If the volume of DNS queries from endpoints associated with the backup border element is below a threshold capacity of the backup border element, as determined at 460, then the system responds to the DNS query at 470 with an identification of the backup border element for use by the endpoint in registering for the multimedia service. If the volume of DNS queries of the primary border element is above a threshold capacity of the primary border element, and if a volume of DNS queries of the backup border element is above a threshold capacity of the backup border element, then the system responds at 480 to the DNS query with a message forcing the endpoint to transmit another DNS query at a later time.

The alternative architecture and methods presented herein do not require modification of border elements or VoIP user endpoints. The REGISTER message flood at the border elements that normally occurs in the aftermath of a catastrophic failure is greatly reduced or completely avoided. The architecture may be configured to be fully standards compliant.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. The described embodiments are merely illustrative of the principles of the present invention and various modifications may be implemented by those skilled in the art without departing from the scope and spirit of the invention.

What is claimed is:

1. A method for registering a multimedia endpoint via a border element in a multimedia network, the method comprising:
    at a domain name system server in the multimedia network, receiving a domain name system query from the multimedia endpoint, the query containing an identifier of the multimedia end point and requesting an address of the border element for use in registering for a multimedia service;
    based on the identifier of the multimedia end point, determining a primary border element associated with the multimedia end point;
    if a volume of domain name system queries from end points associated with the primary border element is below a threshold capacity of the primary border element, then responding to the domain name system query with an identification of the primary border element for use by the multimedia endpoint in registering for the multimedia service;
    if the volume of domain name system queries from endpoints associated with the primary border element is above the threshold capacity of the primary border element, then:
    determining a backup border element associated with the multimedia end point; and
    if a volume of domain name system queries from endpoints associated with the backup border element is below a threshold capacity of the backup border element, then responding to the domain name system query with an identification of the backup border element for use by the multimedia endpoint in registering for the multimedia service;
    if the volume of domain name system queries from endpoints associated with the primary border element is above a threshold capacity of the primary border element and if the volume of domain name system queries from endpoints associated with the backup border element is above a threshold capacity of the backup border element, then:
    responding to the domain name system query with a message forcing the multimedia endpoint to transmit another domain name system query at a later time.

2. The method of claim 1, wherein responding to the domain name system query with an identification of the backup border element for use by the multimedia endpoint in registering for the multimedia service further comprises randomizing a time-to-live parameter in the domain name system query response to allow reverting of end points to primary border elements in a controlled manner.

3. The method of claim 1, wherein the domain name system server utilizes a standard domain name system protocol in receiving and responding to domain name system queries.

4. The method of claim 1, wherein the border elements are session border controllers.

5. The method of claim 1, wherein the multimedia service is a voice-over Internet protocol service.

6. The method of claim 1, wherein the backup border element is a primary border element associated with a second endpoint.

7. The method of claim 1, wherein the identifier of the multimedia endpoint is an Internet protocol address.

8. The method of claim 1, wherein the address of the border element is a fully qualified domain name.

9. The method of claim 1, wherein, if the volume of domain name system queries is below a threshold capacity of the primary border element, then the method further comprises:
    receiving at the primary border element a registration request from the multimedia end point; and
    transmitting from the primary border element to a network registrar a registration request on behalf of the multimedia endpoint.

10. The method of claim 1, wherein:
    determining a primary border element associated with the multimedia end point further comprises determining a plurality of primary border elements associated with the multimedia end point, and
    responding to the domain name system query with an identification of a primary border element for use by the multimedia endpoint in registering for the multimedia service is performed if the volume of domain name system queries of any one of the associated primary border elements is below a threshold capacity of that primary border element.

11. A non-transitory computer-usable medium having computer readable instructions stored thereon for execution by a processor to perform operations for registering a multimedia endpoint via a border element in a multimedia network, the operations comprising:
- at a domain name system server in the multimedia network, receiving a domain name system query from the multimedia endpoint, the query containing an identifier of the multimedia end point and requesting an address of the border element for use in registering for a multimedia service;
- based on the identifier of the multimedia end point, determining a primary border element associated with the multimedia end point;
- if a volume of domain name system queries from end points associated with the primary border element is below a threshold capacity of the primary border element, then responding to the domain name system query with an identification of the primary border element for use by the multimedia endpoint in registering for the multimedia service;
- if the volume of domain name system queries from endpoints associated with the primary border element is above the threshold capacity of the primary border element, then:
- determining a backup border element associated with the multimedia end point; and
- if a volume of domain name system queries from endpoints associated with the backup border element is below a threshold capacity of the backup border element, then responding to the domain name system query with an identification of the backup border element for use by the multimedia endpoint in registering for the multimedia service;
- if the volume of domain name system queries from endpoints associated with the primary border element is above a threshold capacity of the primary border element and if the volume of domain name system queries from endpoints associated with the backup border element is above a threshold capacity of the backup border element, then:
- responding to the domain name system query with a message forcing the multimedia endpoint to transmit another domain name system query at a later time.

12. The non-transitory computer-usable medium of claim 11, wherein responding to the domain name system query with an identification of the backup border element for use by the multimedia endpoint in registering for the multimedia service further comprises randomizing a time-to-live parameter in the domain name system query response to allow reverting of end points to primary border elements in a controlled manner.

13. The non-transitory computer-usable medium of claim 11, wherein the domain name system server utilizes a standard domain name system protocol in receiving and responding to domain name system queries.

14. The non-transitory computer-usable medium of claim 11, wherein the border elements are session border controllers.

15. The non-transitory computer-usable medium of claim 11, wherein the multimedia service is a voice-over Internet protocol service.

16. The non-transitory computer-usable medium of claim 11, wherein the backup border element is a primary border element associated with a second endpoint.

17. The non-transitory computer-usable medium of claim 11, wherein the identifier of the multimedia endpoint is an Internet protocol address.

18. The non-transitory computer-usable medium of claim 11, wherein the address of the border element is a fully qualified domain name.

19. The non-transitory computer-usable medium of claim 11, wherein, if the volume of domain name system queries is below a threshold capacity of the primary border element, then the operations further comprise:
- receiving at the primary border element a registration request from the multimedia end point; and
- transmitting from the primary border element to a network registrar a registration request on behalf of the multimedia endpoint.

20. The non-transitory computer-usable medium of claim 11, wherein:
- determining a primary border element associated with the multimedia end point further comprises determining a plurality of primary border elements associated with the multimedia end point, and
- responding to the domain name system query with an identification of a primary border element for use by the multimedia endpoint in registering for the multimedia service is performed if the volume of domain name system queries of any one of the associated primary border elements is below a threshold capacity of that primary border element.

* * * * *